(12) United States Patent
Liao et al.

(10) Patent No.: US 8,345,194 B2
(45) Date of Patent: Jan. 1, 2013

(54) LIQUID CRYSTAL LENS AND MANUFACTURING METHOD THEREOF

(75) Inventors: Lin-Yao Liao, Taichung County (TW); Yi-Pai Huang, Chiayi (TW); Yu-Min Lin, Taipei County (TW); Han-Ping D. Shieh, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 182 days.

(21) Appl. No.: 12/889,295

(22) Filed: Sep. 23, 2010

(65) Prior Publication Data
US 2012/0033174 A1    Feb. 9, 2012

(30) Foreign Application Priority Data
Aug. 4, 2010 (TW) ................................. 99126013 A

(51) Int. Cl.
*G02F 1/1333* (2006.01)
*G02F 1/13* (2006.01)
(52) U.S. Cl. .......................... 349/122; 349/187; 349/200
(58) Field of Classification Search .................. 349/122, 349/200, 187
See application file for complete search history.

(56) References Cited

U.S. PATENT DOCUMENTS

| | | | |
|---|---|---|---|
| 4,190,330 A | 2/1980 | Berreman | |
| 4,572,616 A | 2/1986 | Kowel et al. | |
| 5,150,234 A * | 9/1992 | Takahashi et al. | 349/1 |
| 6,359,674 B1 * | 3/2002 | Horiuchi | 349/200 |
| 2007/0171335 A1 * | 7/2007 | Son et al. | 349/96 |
| 2007/0229754 A1 * | 10/2007 | Galstian et al. | 349/200 |

* cited by examiner

*Primary Examiner* — Nathanael R Briggs
(74) *Attorney, Agent, or Firm* — Che-Yang Chen; Law Office of Michael Chen

(57) ABSTRACT

The present invention discloses a liquid crystal lens and a manufacturing method thereof. At least one first electrode is disposed on a first substrate, a first alignment layer is disposed on the first electrode, a liquid crystal layer is disposed on the first alignment layer, a second alignment layer is disposed on the liquid crystal layer, an electric field uniformization layer is disposed on the second alignment layer, at least one second electrode and at least one third electrode are disposed on the electric field uniformization layer, and the second electrode is arranged around the third electrode. A second substrate is disposed on the second electrode and the third electrode. The third electrode which matches up with the second electrode produces an electric field gradient and the liquid crystal layer is affected uniformly by the electric field uniformization layer so as to achieve rapid focus purpose by the liquid crystal.

12 Claims, 6 Drawing Sheets

LIQUID CRYSTAL LENS AND MANUFACTURING METHOD THEREOF

BACKGROUND OF THE INVENTION

1. Field of the Invention

The present invention relates to a liquid crystal lens and a manufacturing method thereof, more specifically to a liquid crystal lens and a manufacturing method thereof that can focus rapidly by applying a small voltage.

2. Description of Related Art

A liquid crystal lens is an optical device that can focus or diverge the light by utilizing the characteristics of a birefringence of liquid crystal molecules and an alignment of liquid crystal molecules with a distribution of an electric field. In order to achieve the result of zoom, a conventional optical zoom lens should include at least two lenses with moving toward or away with each other. Disadvantages of this are that the weight of the overall optical configuration is heavy and its volume is large. The liquid crystal lens can change the focus length by changing the working voltage, and light and thin are the best advantages of the liquid crystal lens so that it is capable of optical zoom in a small space. However, the worst disadvantage is that the thicker thickness of the crystal liquid will cause the reaction time longer. For example, if the thickness of the crystal liquid layer is 60 micrometer, the reaction time of the liquid crystal layer is about 30 seconds and the need of the working voltage is over 30 volt voltage. Due to this, it is quite not convenient for the user in practical applications.

In order to solve the foregoing problems, U.S. Pat. No. 4,190,330 discloses a variable focus liquid crystal lens system, which can change the direction of the crystal liquid by changing the electric field or magnetic field after the liquid crystal material is packaged so that the focal length of the lens system changes from a first focal length to a second focal length. Further, U.S. Pat. No. 4,572,616 discloses another kind of variable focus liquid crystal lens system, which uses special electrodes and electric field to control the direction of the liquid crystal so that different refractions are obtained and the light can be focused. Besides, U.S. Pat. No. 5,150,234 discloses a pickup-lens module, which disposes the liquid crystal lens units into the pickup-lens module so that it's effect to change the focus length, it can reduce the volume of the pickup-lens module, and it's easy to manufacture.

However, longer reaction time and higher working voltage of the problems of the crystal liquid lens still can't be solved effectively in the foregoing patents of the prior art. Therefore, it is very urgent and important to provide a crystal liquid lens that has low working voltage and rapid reaction time.

SUMMARY OF THE INVENTION

In view of the problems in the art above, the object of the present invention is to provide a liquid crystal lens and a manufacturing method using the same so as to solve the problems including longer reaction time and higher working voltage.

According to the object of the present invention, the present invention provides a first substrate, at least one first electrode, a first alignment layer, a liquid crystal layer, a second alignment layer, an electric field uniformization layer, at least one second electrode, at least one third electrode, and a second substrate. Wherein the at least one first electrode is disposed on the first substrate, the first alignment layer is disposed on the at least one first electrode, the liquid crystal layer is disposed on the first alignment layer, the second alignment layer is disposed on the liquid crystal layer, the electric field uniformization layer is disposed on the second alignment layer, the at least one second electrode and the at least one third electrode are disposed on the electric field uniformization layer, and the at least one second electrode is arranged around the at least one third electrode. The second substrate is disposed on the at least one second electrode and at least one the third electrode. The at least one third electrode which matches up with the at least one second electrode produces an electric field gradient and the liquid crystal layer is affected uniformly by the electric field uniformization layer so as to achieve rapid focus purpose by the liquid crystal.

The first substrate and the second substrate are transparent substrates.

The first electrode, the second electrode, and the third electrode are transparent conductive electrodes.

The first electrode is silver, copper, or aluminum.

The electric field uniformization layer is made of transparent polymer material.

A value of the surface resistance of the transparent polymer material is $10^6$ to $10^7$ ohm per unit area.

According to the object of the present invention, the present invention further provides a manufacturing method of a liquid crystal lens, comprising steps of: providing a first substrate and disposing at least one first electrode on the first substrate; then disposing a first alignment layer on the at least one first electrode; then providing a second substrate and disposing at least one second electrode on the second substrate; then disposing at least one third electrode on the at least one second substrate in which the at least one second electrode is arranged around the at least one third electrode; then disposing an electric field uniformization layer on the at least one second electrode and the at least one third electrode; disposing a second alignment layer on the electric field uniformization layer; and last injecting a crystal liquid layer between the first alignment layer and the second alignment layer.

The first substrate and the second substrate are transparent substrates.

The first electrode, the second electrode, and the third electrode are transparent conductive electrodes.

The first electrode is silver, copper, or aluminum.

The electric field uniformization layer is made of transparent polymer material.

A value of the surface resistance of the transparent polymer material is $10^6$ to $10^7$ ohm per unit area.

In concluding, the liquid crystal lens and the manufacturing method using the same in accordance with the present invention include one or more advantages described below:

(1) The liquid crystal lens and the manufacturing method using the same can increase the reaction rate of the liquid crystal lens by disposing the second and the third electrodes to produce a smooth electric field gradient.

(2) The liquid crystal lens and the manufacturing method using the same can dispose a high resistant material among the second electrode, the third electrode, and the liquid crystal layer to solve the problem that the working voltage of the liquid crystal lens is too high.

DETAILED DESCRIPTION OF THE PREFERRED EMBODIMENTS

Figure 1:
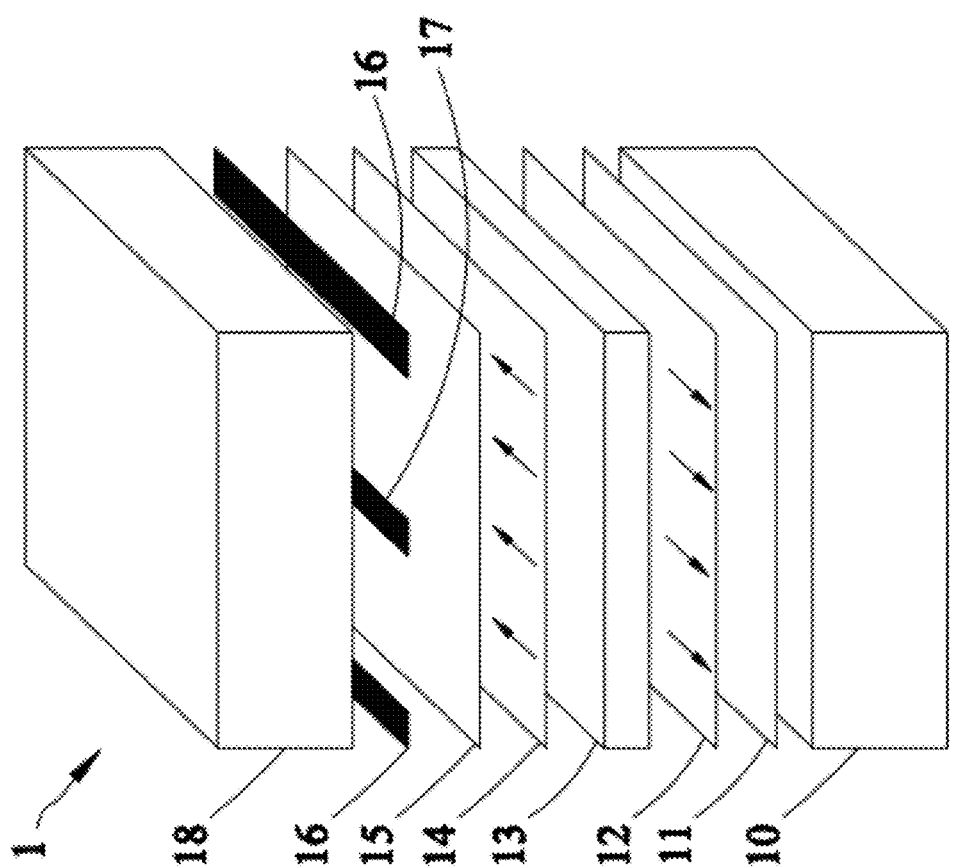
FIG. 1 is a schematic drawing of a structure of a liquid crystal lens in accordance with the present invention.

Please refer to FIG. 1, which is a schematic drawing of a structure of a liquid crystal lens in accordance with the present invention. As shown in the drawing, in this embodiment, the liquid crystal lens 1 according to the present invention includes a first substrate 10, a first electrode 11, a first alignment layer 12, a liquid crystal layer 13, a second alignment layer 14, an electric field uniformization layer 15, second electrodes 16, a third electrode 17, and a second substrate 18, wherein the first electrode 11 is disposed on the first substrate 10, the first alignment layer 12 is disposed on the first electrode 11, the liquid crystal layer 13 is disposed on the first alignment layer 12, the second alignment layer 14 is disposed on the liquid crystal layer 13, the electric field uniformization layer 15 is disposed on the second alignment layer 14, the second electrodes 16 and the third electrode 17 are disposed on the electric field uniformization layer 15, and the second electrodes 16 are arranged around the third electrode 17. The second substrate 18 is disposed on the second electrodes 16 and the third electrode 17. The second electrodes 16 and the third electrode 17 which is matched with the second electrodes 16 produce an electric field gradient and the liquid crystal layer 13 is affected uniformly by the electric field uniformization layer 15 so as to achieve rapid focus purpose by the liquid crystal.

In the present embodiment, the second electrodes 16 and the third electrode 17 are all disposed on the electric field uniformization layer 15 and are in the form of long strip shape. The third electrode 17 is disposed between the two second electrodes 16 so as to produce the electric field gradient to make the liquid crystal alignment change.

However, one skilled in the art of the present invention will recognize that the shape of the second electrode 16 and the third electrode 17 can be easily modified. For example, they are in the form of a circle shape which can be referred to FIG. 6 that shows the circle shape of the second electrode 16 and a circle dot shape of the third electrode 17 disposed in the center of the circle, an elliptical shape or all kinds of polygonal shapes etc.

Figure 6:
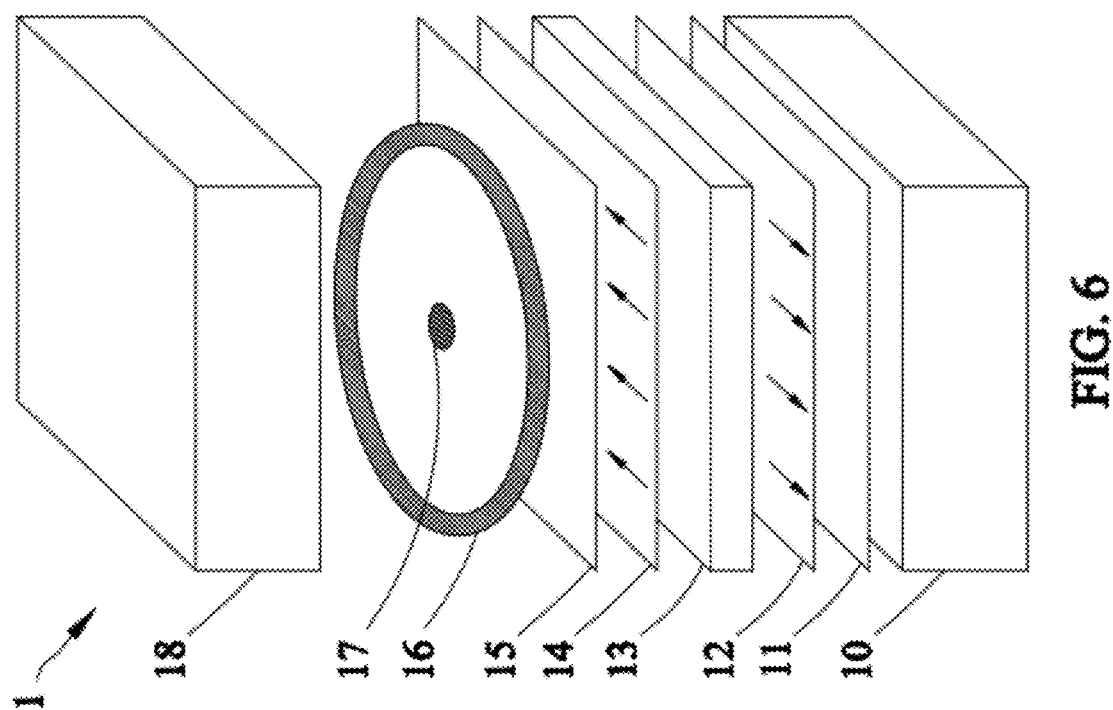
FIG. 6 is a schematic drawing of an another structure of a liquid crystal lens in accordance with the present invention

The long strip shape described in the present embodiment or the circle shape of the second electrode 16 and the third electrode 17 shown in FIG. 6 are only used to take examples not to restrict themselves. It should make a statement first.

In some preferred embodiments, the first substrate 10 and the second substrate 18 are transparent substrates, and they can also be a rigid glass substrate or soft plastic substrate.

The first electrode 11, the second electrodes 16, and the third electrode 17 are transparent conductive electrodes, preferably they are an indium tin oxide (ITO), and they can also be an indium zinc oxide (IZO) or a zinc oxide (ZnO). Besides, in another preferred embodiment, the first electrode 11 can be silver, copper, or aluminum and be used for a grounding electrode.

Furthermore, the first alignment layer 12 and the second alignment layer 14 can be a polyimide (PI) and they are used for aligning liquid crystal. As shown in the drawing, the angle between the aligning directions of these two alignment layer 12-14 is 180 degree, and the aligning directions is the direction of arrows in the drawing.

Besides, the liquid crystal layer 13 can be nematic liquid crystals, and the characteristic of the liquid crystal material will directly impact on the focus time and focus quality.

Notedly, the electric field uniformization layer 15 is made of a transparent polymer material, and the value of the surface resistance of the transparent polymer material is $10^6$ to $10^7$ ohm per unit area. The transparent polymer material can be PEDOT-based material. In some preferred embodiments, the transparent polymer material can be 3,4-polyethylenedioxythiophene-polystyrenesulfonate (PEDOT:PSS).

Figure 2:
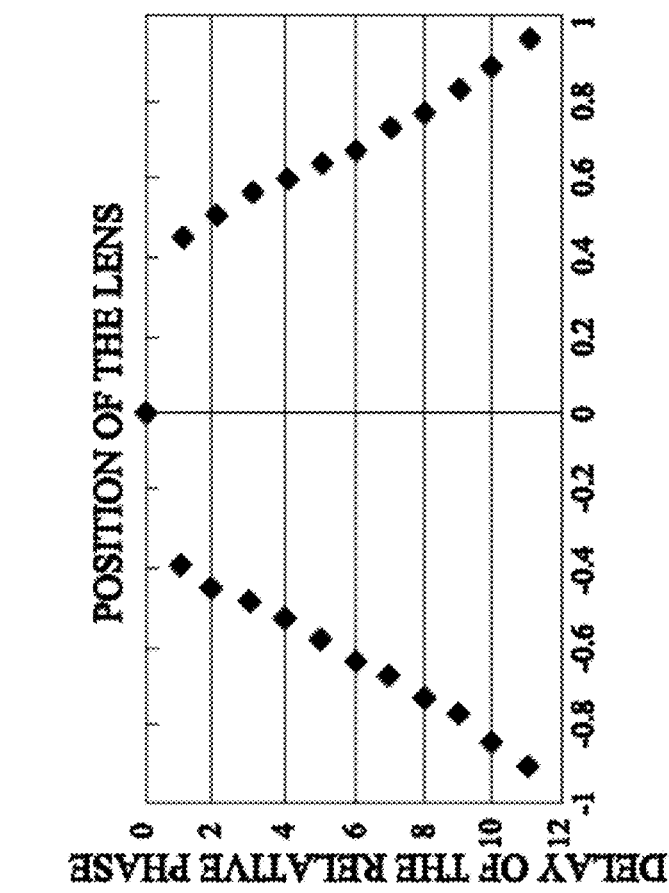
FIG. 2 is a schematic drawing of the liquid crystal lens in accordance with a first embodiment of the present invention.
Figure 2:
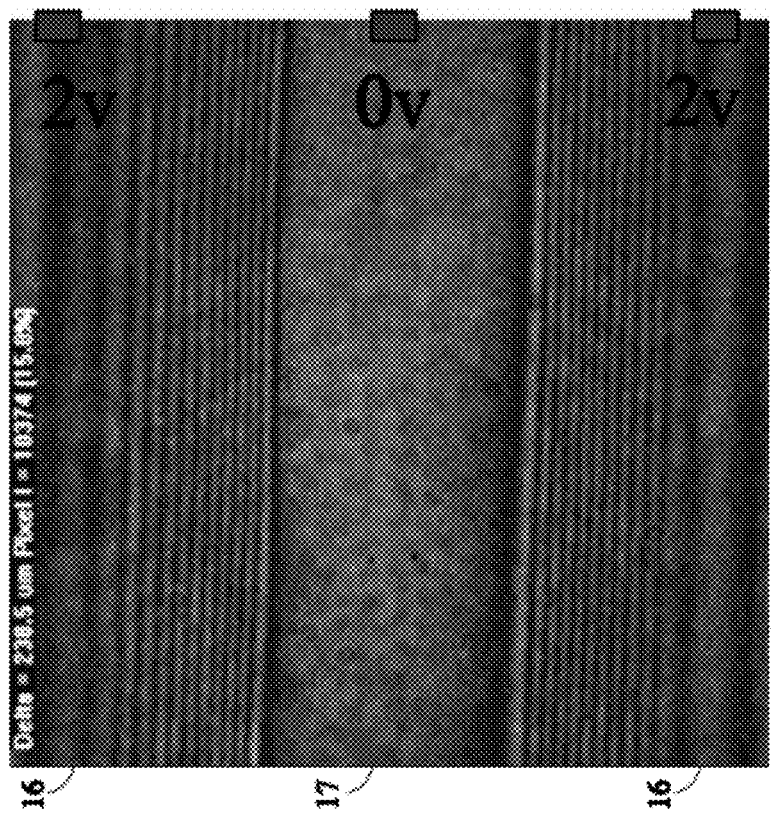
Figure 3:
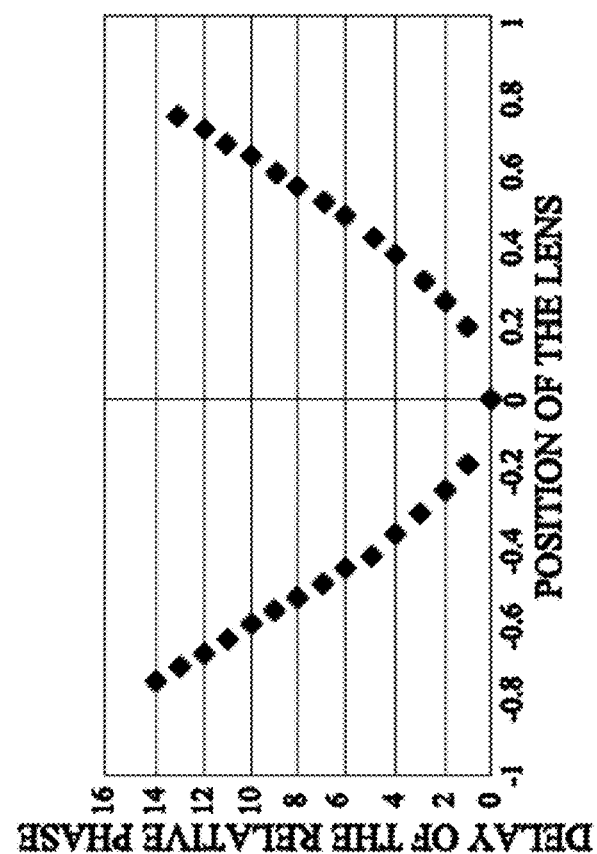
FIG. 3 is a schematic drawing of the liquid crystal lens in accordance with a second embodiment of the present invention.
Figure 3:
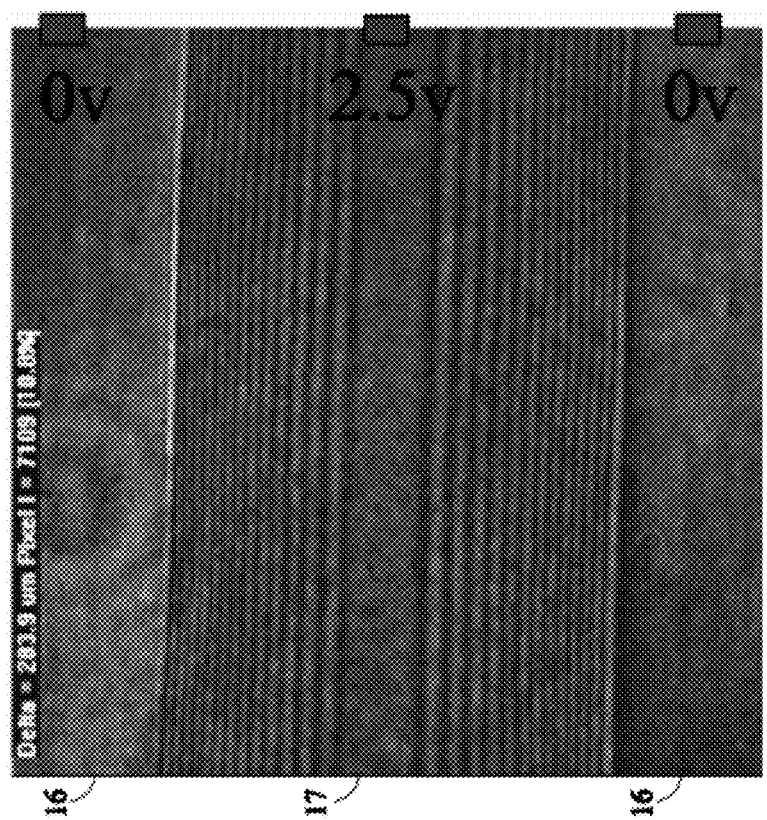

Please refer to FIG. 2 and FIG. 3, which are schematic drawings of the liquid crystal lens in accordance with first and second embodiments of the present invention. As shown in the left of FIG. 2, in the present embodiment 2 volt voltage is applied to the two second electrodes 16, and 0 volt voltage is applied to the third electrode 17 so as to change the aligning direction of the liquid crystal like a convex lens, as shown in the right of FIG. 2. On the other hand, as shown in the left of FIG. 3, in the present embodiment 0 volt voltage is applied to the two second electrodes 16, and 2.5 volt voltage is applied to the third electrode 17 so as to change the aligning direction of the liquid crystal like a concave lens, as shown in the right of FIG. 3. Therefore, the aligning direction and the direction change of the liquid crystal can be controlled precisely to produce the effects of the convex or concave lens by applying different voltages to the second electrodes and the third electrode to produce different electric field gradient.

Figure 4:
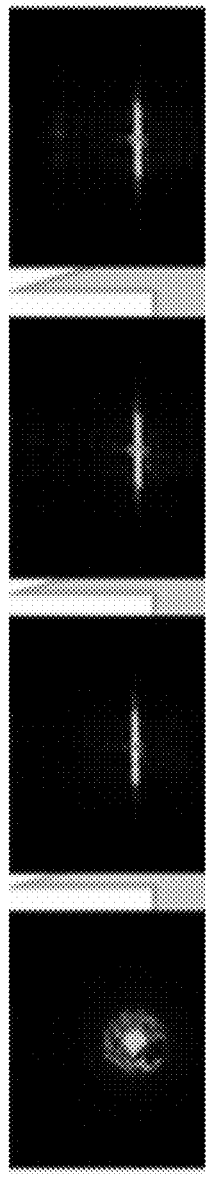
FIG. 4 is a compared drawing of a focus process between a conventional liquid crystal lens and the liquid crystal lens in accordance with first embodiment of the present invention.
Figure 4:
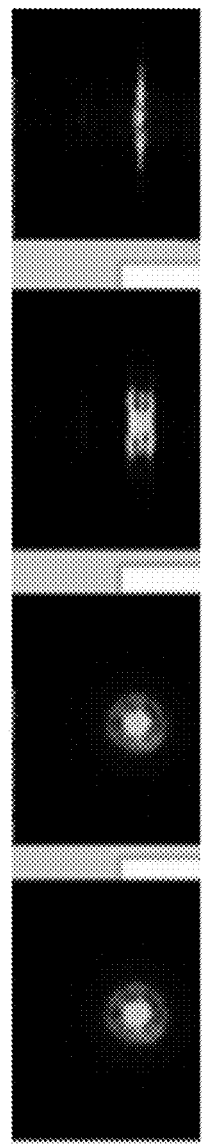

Please refer to FIG. 4, which is a compared drawing of a focus process between a conventional liquid crystal lens and the liquid crystal lens in accordance with the first embodiment of the present invention. In the present embodiment, firstly a square wave of 20 volt voltage and 1000 Hz is applied to the two second electrodes of the liquid crystal lens in accordance with the present invention, and the third electrode retains 0 volt voltage. The liquid crystal lens in accordance with the present invention is focused completely after 0.2 second, and then another square wave of 3.5 volt voltage and 1000 Hz is applied to the two second electrodes. This can retain the liquid crystal lens in the stable focusing state and can reduce the energy consumption.

As shown in the drawing, the upper row of the drawing shows the focus process of the liquid crystal lens in accordance with the first embodiment of the present invention, and the lower row of the drawing shows the focus process of the conventional liquid crystal lens. It is known that compared the upper row with the lower row of the drawing, the focusing effect is slowly produced after the conventional liquid crystal lens is applied 22 volt voltage and at least 4 seconds, and the stable focusing result is produced after 25 seconds. Contrasting with the prior art, the focusing effect of the liquid crystal lens disclosed in the present invention is completely produced after 0.2 second, and the focusing result of the liquid crystal lens can be maintained more stable after focusing and the less voltage is consumed. Therefore, the disadvantages of the conventional liquid crystal lens, such as slower reaction rate and higher power consumption, are indeed improved.

Although the above description of the liquid crystal lens in accordance with the present invention also illustrates a concept of a manufacturing method for the liquid crystal lens in accordance with the present invention at the same time, for clearly explanation, a flow chart is still provided below for detailed description.

Figure 5:
FIG. 5 is a flow chart of a manufacturing method for a liquid crystal lens in accordance with the present invention.

Please refer to FIG. 5, which is a flow chart of a manufacturing method for a liquid crystal lens in accordance with the present invention. As shown in the drawing, a manufacturing method of a liquid crystal lens in accordance with the present invention, comprising steps of:

(S10) providing a first substrate;
(S11) disposing at least one first electrode on the first substrate;
(S12) disposing a first alignment layer on the at least one first electrode;
(S13) providing a second substrate;
(S14) disposing at least one second electrode on the second substrate;
(S15) disposing at least one third electrode on the second substrate in which the second electrode is arranged around the third electrode;
(S16) disposing an electric field uniformization layer on the second electrode and the third electrode;
(S17) disposing a second alignment layer on the electric field uniformization layer; and
(S18) injecting a crystal liquid layer between the first alignment layer and the second alignment layer.

The liquid crystal lens which is made by the manufacturing method of the liquid crystal lens in accordance with the present invention has already described above; therefore, no longer gives unnecessary detail here.

In concluding, the liquid crystal lens and the manufacturing method using the same in accordance with the present invention can increase the reaction rate of the liquid crystal lens by disposing the second and the third electrodes to produce a smooth electric field gradient. Also, a high resistant material can be disposed among the second electrode, the third electrode, and the liquid crystal layer to effectively uniformize the applied electric field gradient and to solve the problem that the working voltage of the liquid crystal lens is too high.

The foregoing description is only used for example not for restriction. Any equivalent modifications and substitutions which are not depart from the spirit and the scope of the present invention should all be included in the claim below.

What is claimed is:

1. A liquid crystal lens, comprising:
a first substrate;
at least one first electrode disposed on the first substrate;
a first alignment layer disposed on the at least one first electrode;
a liquid crystal layer disposed on the first alignment layer;
a second alignment layer disposed on the liquid crystal layer;
an electric field uniformization layer disposed on the second alignment layer, arranged for maintaining a substantially smooth electric field gradient in order to affect unity of the liquid crystal layer so as to achieve rapid focusing and reducing a working voltage of the liquid crystal layer;
at least one second electrode disposed on the electric field uniformization layer;
at least one third electrode disposed on the electric field uniformization layer, and the at least one second electrode arranged around the at least one third electrode; and
a second substrate disposed on the at least one second electrode and the at least one third electrode;
wherein the smooth electric field gradient is produced by the second electrode and the third electrode.

2. The liquid crystal lens according to claim 1, wherein the first substrate and the second substrate are transparent substrates.

3. The liquid crystal lens according to claim 1, wherein the at least one first electrode, the at least one second electrode, and the at least one third electrode are transparent conductive electrodes.

4. The liquid crystal lens according to claim 1, wherein the at least one first electrode is silver, copper, or aluminum.

5. The liquid crystal lens according to claim 1, wherein the electric field uniformization layer is made of transparent polymer material.

6. The liquid crystal lens according to claim 5, wherein a value of the surface resistance of the transparent polymer material is $10^6$ to $10^7$ ohm per unit area.

7. A manufacturing method of a liquid crystal lens, comprising steps of:
providing a first substrate;
disposing at least one first electrode on the first substrate;
disposing a first alignment layer on the at least one first electrode;
providing a second substrate;
disposing at least one second electrode on the second substrate;
disposing at least one third electrode on the second substrate in which the at least one second electrode is arranged around the at least one third electrode;
disposing an electric field uniformization layer on the at least one second electrode and the at least one third electrode;
disposing a second alignment layer on the electric field uniformization layer; and
disposing a crystal liquid layer between the first alignment layer and the second alignment layer;
wherein the electric field uniformization layer is arranged for maintaining a substantially smooth electric field gradient in order to affect unity of the liquid crystal layer so as to achieve rapid focusing and reducing a working voltage of the liquid crystal layer;
wherein the smooth electric field gradient is produced by the second electrode and the third electrode.

8. The manufacturing method according to claim 7, wherein the first substrate and the second substrate are transparent.

9. The manufacturing method according to claim 7, wherein the at least one first electrode, the at least one second electrode, and the at least one third electrode are transparent conductive electrodes.

10. The manufacturing method according to claim 7, wherein the at least one first electrode is silver, copper, or aluminum.

11. The manufacturing method according to claim 7, wherein the electric field uniformization layer is made of transparent polymer material.

12. The manufacturing method according to claim 11, wherein a value of the surface resistance of the transparent polymer material is $10^6$ to $10^7$ ohm per unit area.

* * * * *